United States Patent
Khandelwal et al.

(10) Patent No.: US 12,406,017 B1
(45) Date of Patent: Sep. 2, 2025

(54) INCORPORATING MACHINE LEARNING RECOMMENDATIONS INTO PRESENTATION OF NETWORK INFORMATION

(71) Applicant: Amazon Technologies, Inc., Seattle, WA (US)

(72) Inventors: Gaurav Khandelwal, Kota (IN); Afreen Afreen, Kanpur (IN); Siddharth Verma, Seattle, WA (US); Sridhar Komandur, Redmond, WA (US); Pradeep Ramesha, Bangalore (IN); Hasamatulla Baig Mirja Mahammad, Vijayawada (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/757,098

(22) Filed: Jun. 27, 2024

(51) Int. Cl.
| | |
|---|---|
| *G06F 16/9538* | (2019.01) |
| *G06F 9/54* | (2006.01) |
| *G06F 16/9535* | (2019.01) |
| *G06F 16/957* | (2019.01) |
| *G06F 40/106* | (2020.01) |
| *G06F 40/197* | (2020.01) |
| *G06N 20/00* | (2019.01) |

(52) U.S. Cl.
CPC .......... *G06F 16/9538* (2019.01); *G06F 9/547* (2013.01); *G06F 16/9535* (2019.01); *G06F 16/9574* (2019.01); *G06F 16/9577* (2019.01); *G06F 40/106* (2020.01); *G06F 40/197* (2020.01); *G06N 20/00* (2019.01)

(58) Field of Classification Search
CPC ............ G06F 16/9538; G06F 16/9574; G06F 16/9535; G06F 16/9577; G06F 9/547; G06F 40/106; G06F 40/197; G06N 20/00
See application file for complete search history.

(56) References Cited

U.S. PATENT DOCUMENTS

| | | | |
|---|---|---|---|
| 11,138,287 B1 * | 10/2021 | Botero | G06F 40/146 |
| 2023/0061754 A1 * | 3/2023 | Wright | G06Q 10/0833 |

* cited by examiner

*Primary Examiner* — Etienne P Leroux

(74) *Attorney, Agent, or Firm* — Kilpatrick Townsend & Stockton LLP

(57) ABSTRACT

Techniques for incorporating machine learning recommendations into presentation of network information within predefined load times are described herein. For example, a computer system can determine, based on a selection via a user interface of a client device presenting first network information, a request for a second network information. The computer system can cause a processor to use a machine learning model to generate a first recommendation based on contextual data and indicating a first parameter to present the second network information. The computer system may access a pre-computed second recommendation based on the contextual data. The second recommendation indicates a second parameter. The computer system can cause of the client device to present the second network information such that the second network information is presented by at least using the first parameter or the second parameter based on a response time for the machine learning model generating the first parameter.

20 Claims, 9 Drawing Sheets

INCORPORATING MACHINE LEARNING RECOMMENDATIONS INTO PRESENTATION OF NETWORK INFORMATION

BACKGROUND

Various computing services can be available to devices via online systems that implement various processing components. Each of the processing components may handle large amounts of data and multiple device connections simultaneously. Some aspects of such computing services, such as loading checkout webpages, may have strict latency requirements.

BRIEF DESCRIPTION OF THE DRAWINGS

Various embodiments in accordance with the present disclosure will be described with reference to the drawings, in which.

DETAILED DESCRIPTION

Figure 1:
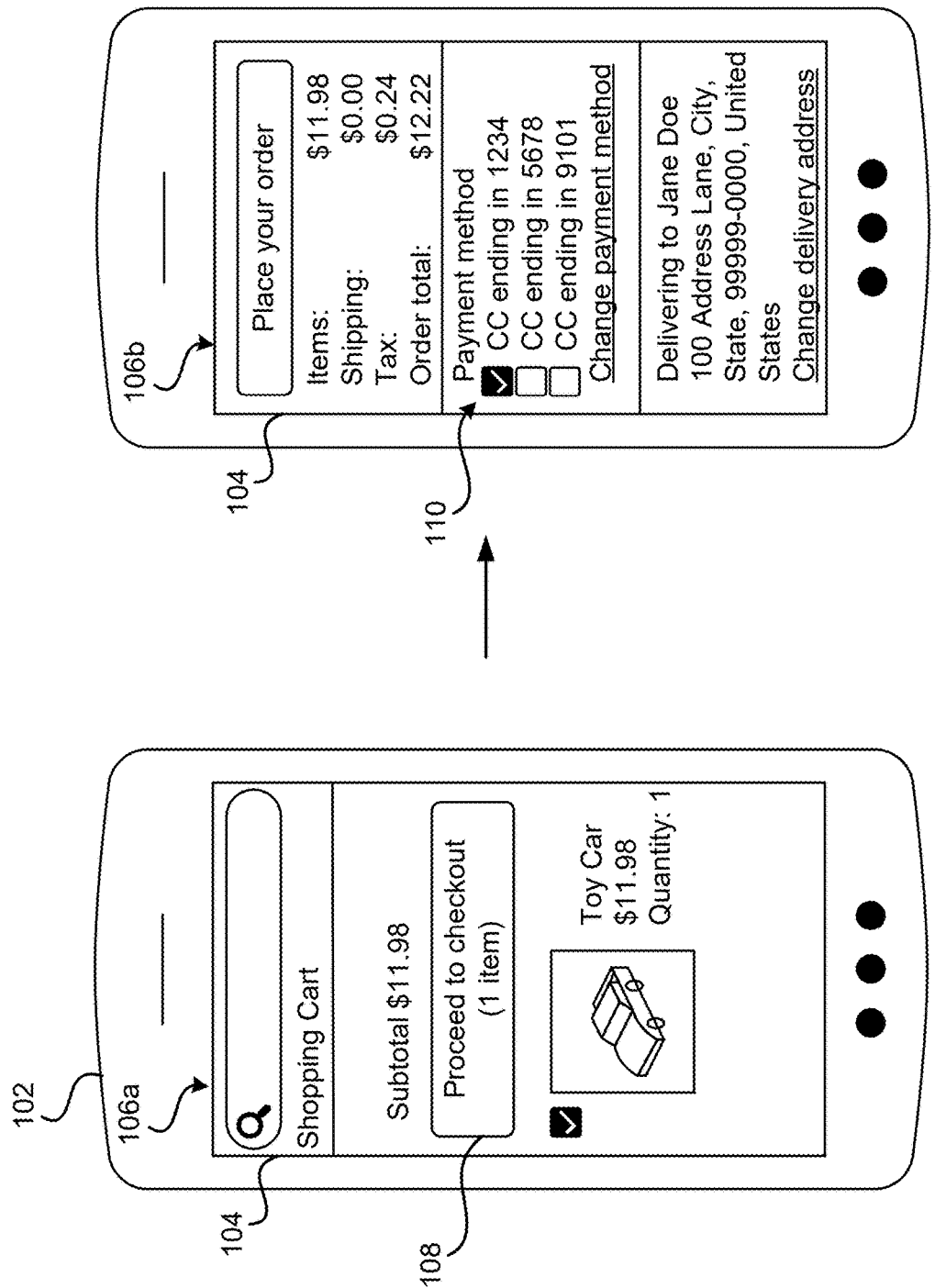
FIG. 1 illustrates an example user interface displaying a first webpage and a second webpage for a service, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, generating recommendations for presentation of network using machine learning, and incorporating the recommendations into presentation of the network information without increasing latency in loading the network information (e.g., a webpage or an application page for a graphical user interface, or an audio response for a voice interface). A user may interact with a user interface on a client device. The user interface can provide a first presentation of first network information. The first network information may include an interface element that can be selected to request presentation of second network information. When a computer system detects selection of the interface element (e.g., a link to the second network information), the computer system can cause a machine learning model to generate a first recommendation for presentation of the second network information. The first recommendation can be generated based on contextual data associated with the first network information, the second network information, the user, and/or the client device. The first recommendation can indicate a first parameter, such as at least one of a layout, a functionality, or a content, of the second network information. If the machine learning model generates the first recommendation within a load time predefined for the second network information (e.g., 25 milliseconds), the computer system can cause the first recommendation to be incorporated into presentation of the second network information on the user interface of the client device. If the first recommendation is not generated within the load time, the computer system can access a cached second recommendation indicating a second parameter (e.g., layout, content, functionality, etc.) to incorporate into presentation of the second network information.

To illustrate, consider an example of an electronic store with a catalog of products. A user may interact with a user interface on a client device to select products from the catalog to purchase. The products may be added to a virtual shopping cart. To purchase the products, the user may interact with the user interface to initiate a checkout process. The checkout process may begin with a computer system causing presentation of a shopping cart webpage on the user interface of the client device. The shopping cart webpage can display the products selected by the user for purchase. The shopping cart webpage may also include a link (e.g., a "next" button) that can be selected to advance the checkout process to a checkout webpage. For example, the checkout page may display or request input of one or more payment methods, a shipping address, a billing address, etc. It may be beneficial to modify presentation of the checkout webpage based on contextual information associated with the current session. Therefore, when the computer system detects selection of the link to advance to the checkout webpage, the computer system can send an application-programming interface (API) call to a machine learning cluster to request generation of a recommendation for presentation of the checkout webpage.

The API call may include contextual data associated with the current session. For example, the contextual data may include the products in the shopping cart, products that were added to and removed from the shopping cart, interaction data indicating product pages that were viewed prior to initiation of the checkout process, user data, geolocation data, client device data, historical user interaction data, or any other relevant data. Additionally, or alternatively, the API call may include a contextual identifier generated from the contextual data. The contextual identifier may be used to select a relevant machine learning model from the machine learning cluster. The contextual data and/or the contextual identifier can be provided as input to the selected machine learning model.

The machine learning model can use the input to generate an output of a recommendation indicating a parameter for the checkout webpage, such as a layout, a functionality, and/or a content to incorporate into the checkout webpage. A parameter may be a setting or change to the code (e.g., HTML code) of the checkout webpage. Examples of layout parameters can include arrangement of elements within the checkout webpage. Examples of content parameters can include text, images, links (e.g., links to images, other webpages, etc.), or any other type of content. Examples of functionality parameters can include features that enable users to perform tasks, such as video players, search engines, interactive elements, etc. For example, the recommendation may include a ranking of payment methods. In some cases, multiple users may use the same account to purchase products from the catalog. The machine learning model may identify a particular user account based on the contextual data and may rank payment methods according to historical payment methods used by the particular user. In another example, the recommendation may involve a higher rank for a payment method with a relatively high points balance. In some examples, the recommendation may include an additional display element, such as a banner prompting the user to add more items to the cart to qualify for a promotion (e.g., free shipping, a discount, etc.). The recommendation can be returned to the computer system as a response to the API call.

The computer system may have strict latency requirements for loading the checkout webpage on the client device. For example, the latency requirement may be 30 milliseconds. To prevent increasing load time of the checkout webpage, the computer system may only incorporate the recommendation into presentation of the checkout webpage if the response to the API call is received within a predefined load time (e.g., 25 milliseconds). If the load time has expired and the response has not yet been received, the computer system may fetch a recommendation from a pre-computed cache to incorporate into presentation of the checkout page.

For example, presenting the shopping cart webpage may trigger the computer system send an API call to the machine learning model to generate a cache of recommendations as part of a parallel, "offline" process. The API call may include an input of one or more contextual identifiers or contextual data collected up until that point. The machine learning model may generate one or more recommendations in the cache based on the input while the user interface is presenting the shopping cart webpage. These cache recommendations can then be accessed as described above if another API call (e.g., sent in response to the user selecting the link to display the checkout webpage) is not returned within the load time. Thus, the checkout webpage can be enhanced with up-to-date contextual data without violating latency requirements.

Embodiments of the present disclosure provide several technological advantages over existing systems. For example, embodiments described herein may involve a computer system (e.g., a web server) that can communicate with client devices. The computer system may transmit network documents (e.g., code for presenting web pages) to a client device in response to requests (e.g., web requests). In many cases, the time between a web request and a web response may be tightly controlled. A computer system that does not return network documents within strict latency requirements (e.g., within 30 milliseconds) may be unusable or suboptimal. Embodiments described herein can allow a computer system to return a network document having a presentation parameter that is controlled by machine learning or a cache while meeting these strict latency requirements. Absent the embodiments described herein, such parameters are not incorporated into network documents. Or, absent the embodiments described herein, parameters generated by machine learning may be used in network documents, but in many cases latency requirements may be violated in returning such network documents to a client device.

FIG. 1 illustrates an example client device 102 with a graphical user interface 104 displaying a first webpage 106a and a second webpage 106b for a service, according to an embodiment of the present disclosure. The service may be a checkout service for an electronic store with a catalog of items that are available for purchase. The items may be physical items or virtual items. The client device 102 is depicted in FIG. 1 as a smartphone, but in other examples the client device 102 may be any type of computing device suitable for use to a user, capable of presenting a user interface, and capable of communicating with one or more computing resources of the electronic store including, for instance, web servers, to receive information and presentation instructions and to present such information based on the presentation instructions. In some examples, the client device 102 may be a smart speaker, a mobile device, a tablet, a smart television, a gaming console, a laptop, a personal computer, a desktop, etc.

As illustrated, the client device 102 may present a first webpage 106a and a second webpage 106b for the service on the graphical user interface 104. The first webpage 106a and the second webpage 106b may be received from a computer system executing the service. The graphical user interface 104 may be an example of a user interface. Other user interface types are possible depending on the type of client device. For example, the user interface may be a voice-based interface presented by a smart speaker or a different computing device that provides an intelligent personal assistance service responsive to a wake word and/or a physical tap and is capable of different interactions including content playing, providing real-time information, and performing tasks and routines.

Generally, the graphical user interface 104 (or the user interface depending on its type) may be an interface to one or more of the computing resources of the service, including to a web server. Content presented on the graphical user interface 104 and its presentation layout and functionalities, including information, input fields, selectable options, actionable options, and the like may be controlled by the computing resource(s) via presentation instructions. For example, the first webpage 106a may be a shopping cart webpage that may display items that were selected from the catalog by the user. The user may interact with the graphical user interface 104 to modify the shopping cart (e.g., by removing items, searching for additional items in a search bar, or modifying a quantity of the items) on the first webpage 106a. The first webpage 106 may also include a button 108 that can be selected to proceed to the second webpage 106b. The second webpage 106b can be a checkout page that can display the shopping cart prices, payment methods, billing addresses, shipping addresses, or any other information suitable for a checkout page. The second webpage 106b may also include an interactable element (e.g., a link or a button) that can be selected to place the order. Other interactable elements can include selection or input of payment methods, addresses, shipping methods, etc.

Presentation of the second webpage 106*b* can be adjusted based on real-time contextual data detected for the current session on the client device 102. For example, contextual data detected with respect to user interactions with the service (e.g., via the graphical user interface 104) can be provided as input to a machine learning model. The contextual data may include the items in the shopping cart, items that were added and removed from the shopping cart, item pages viewed before proceeding to the first webpage 106*a*, user information, device type, Internet Protocol (IP) address, geolocation data, historical user interaction data associated with the user, or any other suitable contextual data. In some examples, the contextual data can be used to generate a contextual identifier. The machine learning model can use the contextual data and/or the contextual identifier to generate a recommendation for a parameter of the second webpage 106*b*, such as a content, a functionality, or layout of the second webpage 106*b*.

For example, the machine learning model may generate a ranking 110 of the payment methods based on the contextual data. The ranking 110 can be incorporated into the second webpage 106*b* such that the second webpage 106*b* can be loaded to display the payment methods according to the ranking 110. The top-ranked payment method may also be pre-selected. The ranking 110 may be personalized to the user, the shopping cart, historical user interaction behavior, and the current session data. For example, payment methods that have historically been declined may be positioned relatively lower in the ranking 110. Payment methods with accumulated points that can be applied to the purchase may be positioned relatively higher in the ranking 110. Other examples of recommendations may involve offers or rewards. For example, the recommendation can involve an interactable element (e.g., a banner or button) that can be selected to join a rewards program or apply a coupon that is specific or relevant to the items in the cart or the user's purchase history. In another example, the recommendation can involve a prompt to the user to increase the shopping cart balance or add additional items to the shopping cart to unlock a benefit, such as free shipping or a discount. The machine learning model can be trained to generate recommendations of parameters for any suitable content, functionality, or layout of the second webpage 106*b* based on the contextual data. Additionally, the recommendation may be generated and incorporated into the second webpage 106*b* within latency requirements for loading the second webpage 106*b* after selection of the button 108.

Figure 2:
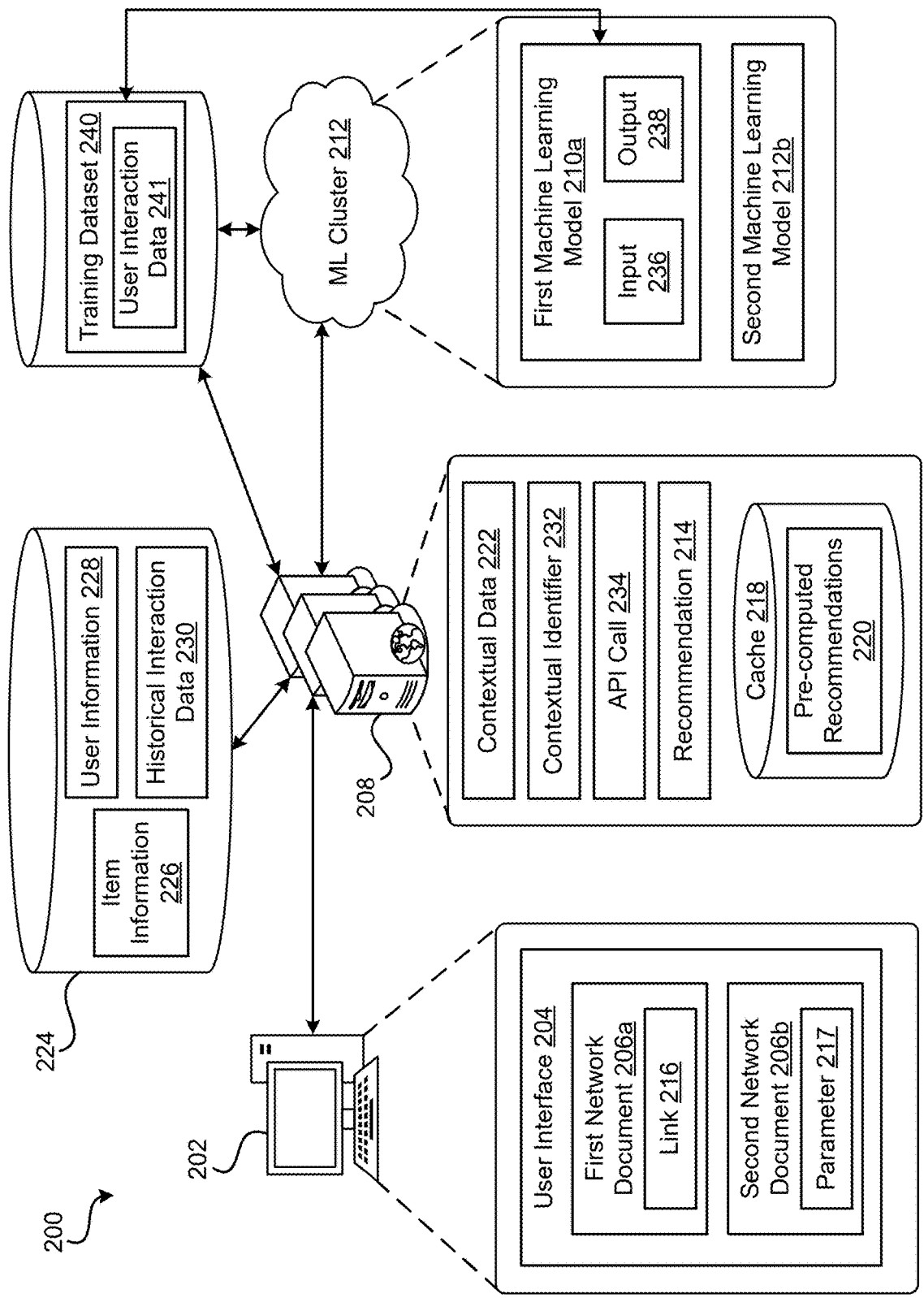
FIG. 2 illustrates an example block diagram of a computing environment for executing a machine learning model to generate a recommendation to incorporate into presentation of a network document, according to an embodiment of the present disclosure.

FIG. 2 illustrates an example block diagram of a computing environment 200 for executing a machine learning model 210 to generate a recommendation 214 to incorporate into presentation of a network document 206, according to an embodiment of the present disclosure. The computing environment 200 can include a client device 202 with a user interface 204 (e.g., a graphical user interface) that can present network documents 206*a-b* (e.g., application pages or webpages). In some examples, the client device 202 may be a smart speaker and the user interface 204 may be a voice interface that a user may interact with via voice prompts. Instead of network documents, network information such as audio responses to the voice prompts may be presented as part of the voice interface, for example.

The client device 202 may be an example of the client device 102 depicted in FIG. 1. The computing environment 200 can further include a computer system 208 that can provide (e.g., host and/or include) a service, which may be an online marketplace (e.g., the electronic store described above in connection with FIG. 1). The computer system 208 may execute processes, such as shopping cart processes, checkout processes, payment processes, preview order processes, or any other processes associated with an online marketplace. Such processes can include generating and transmitting network documents 206*a-b* to be displayed on the user interface 204 of the client device 202.

The computer system 208 can generate and incorporate context-aware recommendations into the presentation of network documents 206*a-b*. For example, the first network document 206*a* may be a shopping cart page of a checkout process. The first network document 206*a* may include a link 216 to the second network document 206*b*, which in some examples may be a checkout page of the checkout process. Requests to present the first network document 206*a* and the second network document 206*b* may initiate recommendation generation processes by the computer system 208.

For example, when a user selection is made (e.g., on another network document) via the user interface 204 to access the first network document 206*a*, the computer system 208 can automatically generate a cache 218 of one or more pre-computed recommendations 220. To generate the cache 218, the computer system 208 can determine contextual data 222. The contextual data 222 may include user interactions with the user interface 204 in the current session (e.g., current shopping session with the online marketplace), such as items selected in the shopping cart displayed by the first network document 206*a*, time spent on various pages such as product pages, number of clicks in the current session prior to accessing the first network document 206*a*, etc. Contextual data 222 may also include device information (e.g., type of device, network connection, location, etc.) and user information. For example, the computer system 208 may access a data structure 224 that stores item information 226, user information 228 for the user interacting with the client device 202, and historical interaction data 230 for previous sessions (e.g., with the online marketplace). The user information 228 may include demographic information for the user, location information, bank account information, or any other suitable information. In some examples, the user information 228 may indicate multiple users (e.g., identified via user identifiers) that access a same user account to interact with the online marketplace. The historical interaction data 230 may include past purchases, items previously added to the shopping cart but not purchased, items removed from the shopping cart, saved items, or any other interaction data associated with previous sessions with the online marketplace.

The computer system 208 can access a machine learning cluster 212 to generate the pre-computed recommendations 220. The machine learning cluster 212 can include a first machine learning model 210*a* and a second machine learning model 210*b*, but in other examples any number or type of machine learning models can be used. Each of the machine learning models 210*a-b* can be trained (e.g., on a training dataset 240) to generate recommendations for parameters, such as content, functionality, and/or layout of the second network document 206*b*. In some examples, the various machine learning models 210*a-b* can be specialized to produce a type of recommendation. For example, the first machine learning model 210*a* may be trained to rank payment methods and the second machine learning model 210*b* may be trained to generate item suggestions based on the current shopping cart. The machine learning models 210*a-b* can be accessed by the computer system 208 via an application-programming interface (API) call 234.

The computer system 208 may provide the contextual data 222 as input 236 to one or more of the machine learning models 210a-b. Additionally or alternatively, the computer system 208 may generate or access one or more contextual identifiers 232 based on the contextual data 222. The contextual identifiers 232 can represent the contextual data 222 and can enable retrieval of relevant recommendations. In some examples, the contextual identifier 232 can be generated by one of the machine learning models 210a-b in the machine learning cluster 212. Examples of contextual identifiers 232 can indicate shopping cart value, item count, shipping destination, client device type, etc. The computer system 208 may generate multiple contextual identifiers 232 or may access a set of predefined contextual identifiers (e.g., selected based on user information 228, such as a user identifier). The contextual identifiers 232 and/or the contextual data 222 can be provided as input 236 to one or more of the machine learning models 210a-b to generate the pre-computed recommendations 220.

The machine learning models 210a-b can use the input 236 to generate one or more pre-computed recommendations 220 indicating parameters for the second network document 206b that can be stored in the cache 218. The cache 218 can be a fallback option that can allow the computer system 208 to integrate a recommendation into the second network document 206b within a latency constraint. But, if possible, it may be beneficial to automatically incorporate a live recommendation 214 into presentation of the second network document 206b in response to the user selecting the link 216 on the first network document 206a to request access to the second network document 206b.

The computer system 208 may have a relatively fast latency constraint for loading the second network document 206b after selection of the link 216. For example, the latency constraint may be 30 milliseconds. The computer system 208 may attempt to generate a context-aware, live recommendation 214 within the latency constraint. To do so, the computer system 208 can generate a contextual identifier 232 based on all contextual data 222 detected up to that point, including contextual data 222 detected while the user was interacting with the first network document 206a. The contextual identifier 232 may be a unique identifier that can represent features of the contextual data 222. The computer system 208 can send the contextual identifier 232 (and, in some examples, the contextual data 222) as part of an API call 234 to the machine learning cluster 212.

In response to the API call 234, the machine learning cluster 212 can select one or more of the machine learning models 210a-b to use to generate the recommendation 214 of a parameter 217 to present the second network document 206b. In some examples, the machine learning cluster 212 can select the first machine learning model 210a based at least in part on the contextual identifier 232. For example, the contextual identifier 232 may include a string of digits or numbers that are associated with the first machine learning model 210a. The contextual identifier 232 (and/or the contextual data 222) provided by the API call 234 can be used as input 236 to the first machine learning model 210a. The first machine learning model 210a can generate an output 238 indicating a recommendation 214 for presentation of the second network document 206b based at least in part on the input 236. The machine learning cluster 212 can then provide the recommendation 214 to the computer system 208 in response to the API call 234.

In some examples, the computer system 208 may receive the recommendation 214 from the machine learning cluster 212 within a load time predefined for the second network document 206b. For example, if the latency constraint for the second network document 206b is limited to 30 milliseconds, the computer system 208 can meet this latency constraint while incorporating the recommendation 214 into presentation of the second network document 206b (e.g., using the parameter 217 in presentation of the second network document 206b). if the response to the API call 234 is received within 25 milliseconds. But in some examples, the response to the API call 234 may not be received before the load time expires. In such cases, the computer system 208 can access the cache 218 to select one of the pre-computed recommendations 220 that are mapped to various contextual identifiers. The computer system 208 can identify a pre-computed recommendation 220 that is mapped to the contextual identifier 232 (or a portion of the contextual identifier 232). The pre-computed recommendation 220 can then be incorporated into presentation of the second network document 206b (e.g., using the parameter 217 in presentation of the second network document 206b) on the user interface 204 of the client device 202 within the latency constraint.

In some examples, the machine learning models 210a-b in the machine learning cluster 212 can be periodically trained in a feedback loop by the computer system 208 providing real-time logging of incoming requests and outgoing responses. For example, the computer system 208 and/or the client device 202 may provide additional data to the training dataset 240, such as user interaction data 241 associated with recommendations presented in the second network document 206b. The first machine learning model 210a can then receive additional training using the user interaction data 241.

The machine learning cluster 212 may include various machine learning models 210a-b that are trained to generate various types of recommendations that can be incorporated into presentation of the second network document 206b (e.g., using the parameter 217 in presentation of the second network document 206b). For example, the first machine learning model 210a may be trained to recommend upranking payment methods (e.g., presenting the payment method in a relatively higher position in a listing of payment methods) that do not require two-factor authentication (e.g., to reduce friction in checkout processes). The first machine learning model 210a may also be trained to recommend upranking a new default payment method based on profile preferences when certain conditions are met. For example, a user for the current session may be an entity on a shared account, so a new default payment method may be highly applicable to one of the entities but may not be applicable to all entities on the shared account. Thus, the new default payment method may only be upranked for the user (e.g., having an associated user identifier) that selected the new default payment method. In some examples, the first machine learning model 210a may be trained to recommend upranking a payment method with a points balance that may be higher than a threshold, or may generate a recommendation to suggest splitting a purchase between a first payment method and a second payment method with a points balance.

In other examples, the first machine learning model 210a may be trained to recommend updating payment methods with a relatively high payment success rate for items that are being purchased in a gift order or if the current shopping session is during a peak shopping period (e.g., during a holiday season). If the contextual data 222 indicates that a shopping cart has a relatively high cart value during checkout, the first machine learning model 210a may be trained to recommend upranking payment methods that provide benefits (e.g., free shipping) if the cart value is above a certain threshold, or payment methods with a relatively high payment success rate. Alternatively, if the contextual data 222 indicates that the shopping cart has a relatively low cart value during checkout, the first machine learning model 210a may be trained to generate a recommendation to display a banner describing an incentive to increase the cart value.

In some examples, the first machine learning model 210a may also be trained to generate recommendations for upranking certain types of payment methods, such as recommending FSA or EBT cards for eligible items in the shopping cart. Or, the first machine learning model 210a may generate a recommendation that upranks a type of payment method such as an HSA card that has expiring funds. Additionally, the first machine learning model 210a may be trained to generate a recommendation to display a prompt for adding saved items to the shopping cart, using a gift card that has a balance that covers the cost of the shopping cart, splitting the cost of the shopping cart between a gift card and another card, etc. Such prompts can be incorporated into banners or recommendation sleeves that can be presented on the second network document 206b.

Figure 3:
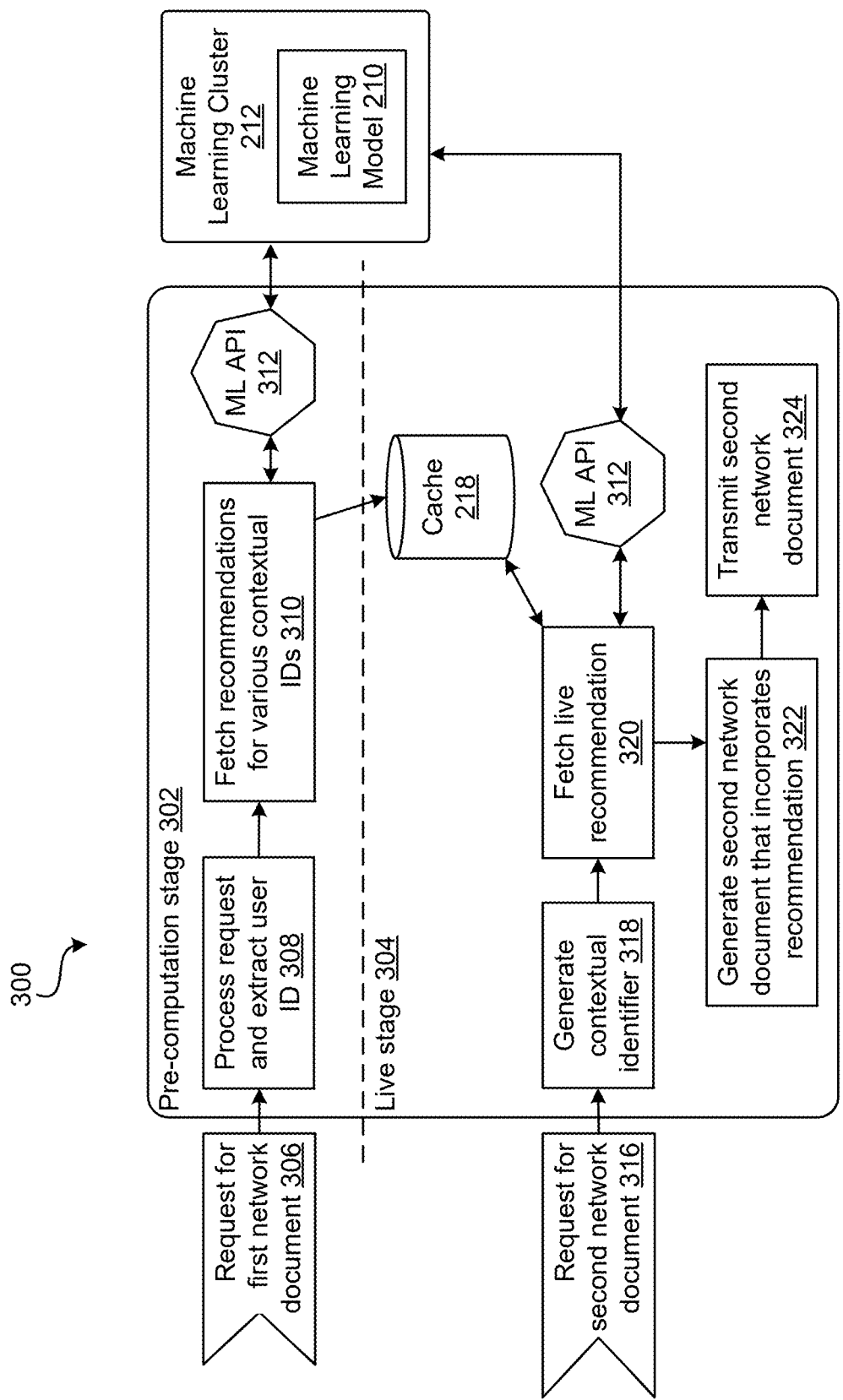
FIG. 3 illustrates an example block diagram of a pre-computation stage and a live stage of a personalization service for incorporating a recommendation into presentation of a network document, according to an embodiment of the present disclosure.

FIG. 3 illustrates an example block diagram of a personalization service 300 with a pre-computation stage 302 and a live stage 304 for incorporating a recommendation into presentation of a network document, according to an embodiment of the present disclosure. The personalization service 300 can be executed by a computer system, such as the computer system 208 of FIG. 2, to generate a network document (e.g., second network document 206b) that incorporates presentation of recommendations based on real-time, contextual data in response to receiving a request to access the network document. The personalization service 300 can present a network document with an incorporated recommendation within latency constraints by using a pre-computation stage 302 and a live stage 304.

The pre-computation stage 302 can begin with step 306 involving the personalization service 300 receiving a request for presentation of a first network document on a client device (e.g., the first network document 206a of FIG. 2 or the first webpage 106a of FIG. 1). The client device requesting presentation of the first network document can trigger the personalization service 300 to perform a second step 308 of processing the request and extracting a user identifier (e.g., for a user account accessing the first network document). For example, the personalization service 300 can determine the user identifier based on information provided in the request.

Then, at step 310, the personalization service 300 can fetch recommendations for various contextual identifiers by using the user identifier. For example, the personalization service 300 can access historical user interaction data associated with the user identifier to generate one or more contextual identifiers. In some examples, the one or more contextual identifiers can also be generated based on contextual data detected for the current session. Or, the personalization service 300 can select one or more contextual identifiers from a set of predefined contextual identifiers based on the historical user interaction data. The personalization service 300 can then use a machine learning application-programming interface (ML API) 312 to transmit the one or more contextual identifiers to a machine learning cluster 212. For each of the one or more contextual identifiers, the machine learning cluster 212 can select an associated machine learning model 210 and execute the machine learning model 210 to generate a recommendation based on the contextual identifier. The machine learning cluster 212 can return one or more recommendations based on the one or more contextual identifiers to the personalization service 300 using the ML API 312. Each of the one or more recommendations can indicate a parameter for presentation of the second network document, such as a content, a layout, or a functionality of the second network document.

After receiving the one or more recommendations via the ML API 312 (e.g., according to a priority order), the personalization service 300 can store the one or more recommendations in a cache 218. Although the personalization service 300 is depicted in FIG. 3 as performing the pre-computation stage 302 in response to receiving a request for a first network document, in other examples other suitable events may trigger execution of the pre-computation stage 302.

The live stage 304 can begin with step 316, which can involve receiving a request for a second network document. In some examples, the request for the second network document may be received in response to a selection of a link to the second network document that was presented in the first network document. The personalization service 300 can then perform step 318, which can involve generating a contextual identifier from contextual data. In some examples, the contextual identifier may be generated by providing the contextual data to a machine learning model, such as a machine learning model in the machine learning cluster 212. In other examples, the contextual identifier may be generated by applying a set of rules to the contextual data.

For example, the personalization service 300 may fetch records associated with the user identifier to determine one or more recent contextual identifiers for the user identifier. By intersecting the one or more recent contextual identifiers, the personalization service 300 can apply a set of rules to the contextual data to identify a subset of corresponding contextual identifiers that possess entries in the cache 218. For example, the personalization service 300 can determine the subset of contextual identifiers for whom the set of rules applied to the contextual data would return as true. From this subset, the personalization service 300 can select a contextual identifier with a lowest priority value, which may indicate a preferred contextual identifier. An assumption can be made that in a worst-case scenario, a predefined number of rules will be the same for each contextual identifier. In some examples, generating the contextual identifier by first filtering from pre-computed contextual identifiers in the cache 218 may conserve resource management and latency by lowering the processing load of the personalization service 300, compared to generating a new contextual identifier without accessing the cache 218.

After generating the contextual identifier based on live contextual data, the personalization service 300 can perform step 320, which can involve fetching a live recommendation using the contextual identifier. For example, the personalization service 300 can use the ML API 312 to send an API call with the contextual identifier to the machine learning cluster 212. The machine learning cluster 212 can execute a machine learning model 210 to generate a live recommendation from the contextual identifier. The live recommendation may indicate a parameter for presenting the second network document, such as a layout, a functionality, or a content of the second network document. If the machine learning cluster 212 returns the recommendation to the personalization service 300 via the ML API 312 within a load time predefined for the second network document, the personalization service 300 can proceed to step 322. But if the load time has expired and the machine learning cluster 212 has not returned a response to the API call, the personalization service 300 can access the cache 218 to identify and select a pre-computed recommendation that is mapped to the contextual identifier. The personalization service 300 can then proceed to step 322.

At step 322, the personalization service 300 can generate the second network document by incorporating the recommendation into presentation of the second network document. This can involve causing the second network to be presented by at least using the parameter. For example, the recommendation may involve ranking payment methods, and the second network can be modified to display the payment methods according to the ranking. In another example, the recommendation may include presenting a warning regarding a payment method that was previously declined. The second network document can therefore be modified to include text indicating that a payment method was previously declined. In yet another example, the recommendation may involve notifying a user that using a particular payment method may provide free shipping. The second network document can then be modified to autoselect the particular payment method and include text notifying the user that use of the particular payment method can provide free shipping. Any other suitable recommendation to content or layout of the second network document can be incorporated into presentation of the second network document. Then, the personalization service 300 can perform step 324, which can involve transmitting the second network document to the client device for display on a user interface. The personalization service 300 can transmit the second network document with the incorporated recommendation to the client device within a latency constraint for the second network document from the time the request for the second network document was received.

Figure 4:
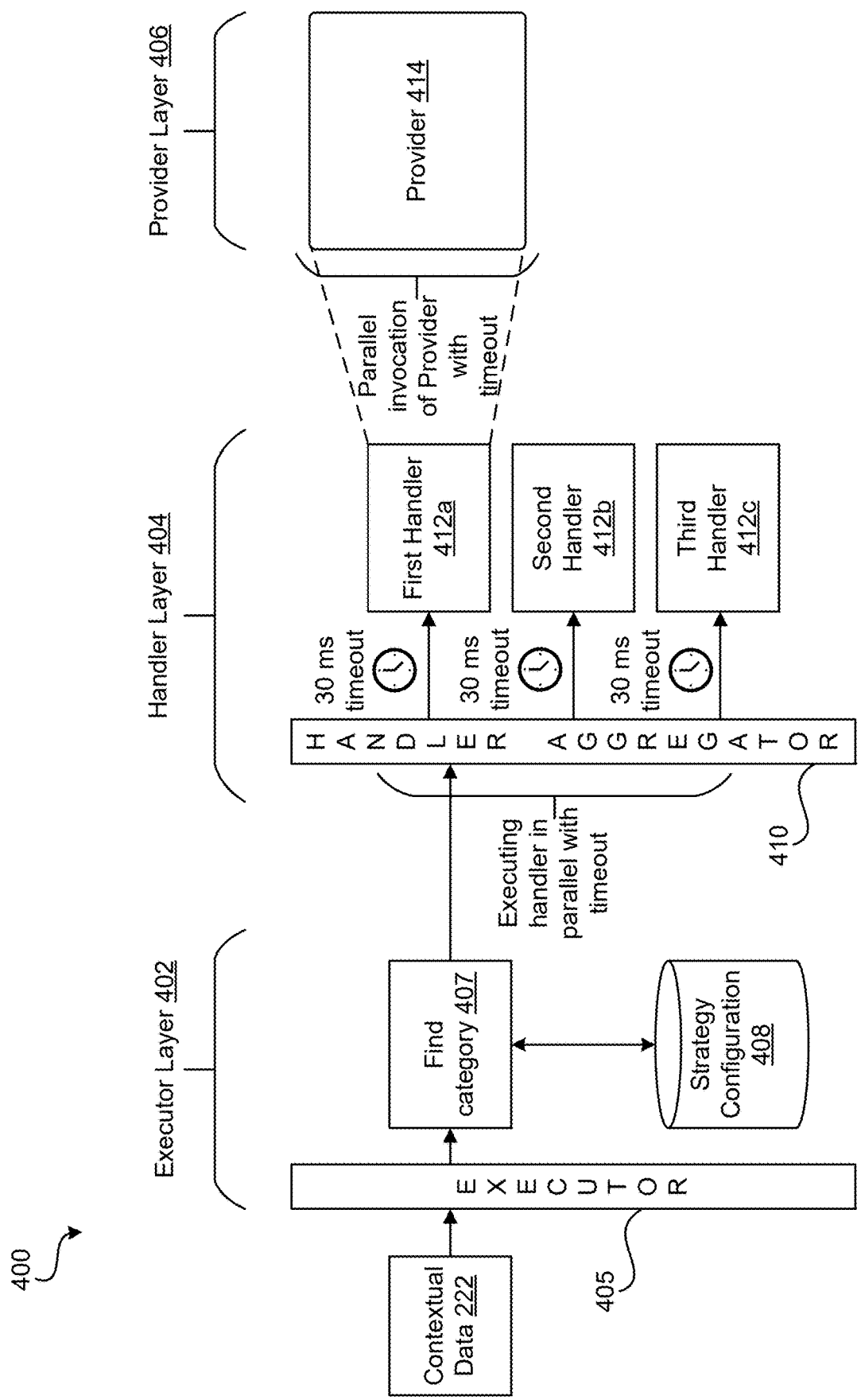
FIG. 4 illustrates a block diagram of layers of a personalization service that generates a recommendation for presentation of a network document, according to an embodiment of the present disclosure.

FIG. 4 illustrates a block diagram of layers of a personalization service 400 that generates a recommendation for presentation of a network document, according to an embodiment of the present disclosure. The personalization service 400 can be an example of the personalization service 300 of FIG. 3.

The personalization service 400 can include an executor layer 402, a handler layer 404, and a provider layer 406. The executor layer 402 can include an executor 405 that can receive contextual data 222. The executor 405 can use the contextual data 222 to perform step 407, which can involve finding a category for the contextual data 222. The category may be a specific group or class of entities or data that a machine learning model may be trained to identify, classify, or otherwise process to generate a recommendation for presentation of a network document. The executor 405 can find the category by accessing a strategy configuration 408 that maps handlers 412a-c (e.g., associated with categories) to contextual data 222. Examples of categories can include a cart context category (e.g., a cart item count, a cart value, item type, item distribution, item wishlist, etc.), an identity context category (e.g., whether the account is single user or shared between multiple users, user identifiers for individual users in a shared account), a geolocation context category (e.g., a shipping address, a zip code for the shipping address, an electronic store identifier), an eligibility context category (e.g., whether the account is eligible for a rewards program, types of items that are compatible with a payment method, such an HSA card), or a wallet context category (e.g., a gift card balance, a points balance). In some examples, the executor 405 can find the category based on a type of client or a client identifier for the current session. For example, the client identifier may identify a particular client that is selling the items that are being purchased in a current shopping session by a user. Different client identifiers can be mapped to different categories. The handlers associated with the identified categories can be invoked for the handler layer 404.

The executor layer 402 can include a handler aggregator 410 that can execute handlers 412a-c in parallel with timeout (e.g., a timeout of 30 milliseconds). The contextual data 222 and the categories can be fed to each handler 412a-c. Examples of handlers 412a-c can include a discovery handler or a ranking handler. Each of the handlers 412a-c can invoke a provider 414 in the provider layer 406 to generate recommendations. The handlers 412a-c can invoke providers in parallel with timeout. Execution of the provider 414 is described in further detail with respect to FIG. 5.

Figure 5:
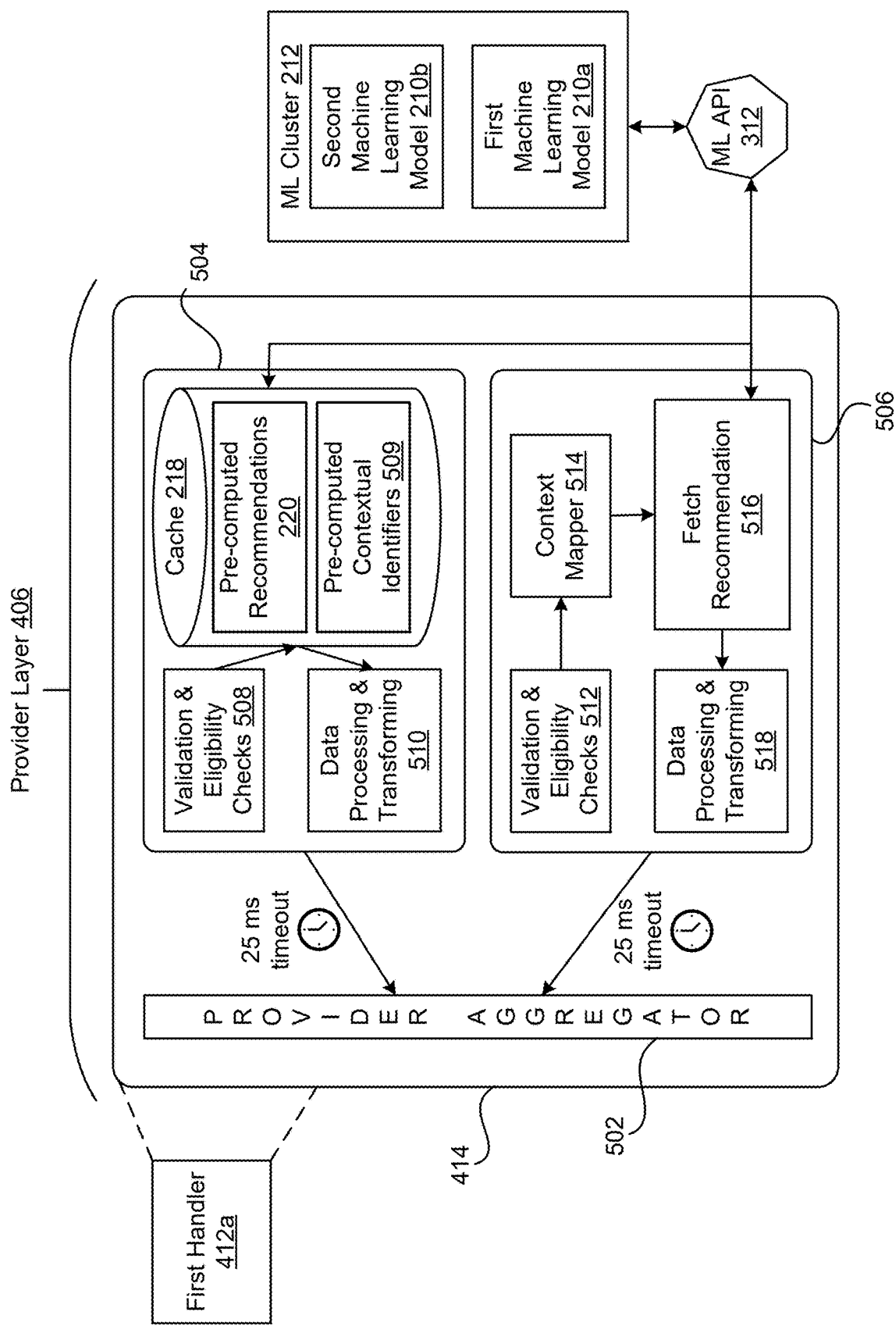
FIG. 5 illustrates a block diagram of a provider layer of the personalization service that generates a recommendation for presentation of a network document, according to an embodiment of the present disclosure.

FIG. 5 illustrates a block diagram of the provider layer 406 of the personalization service of FIGS. 3 and 4 that generates a recommendation for presentation of a network document, according to an embodiment of the present disclosure. The provider 414 may be executed by the first handler 412a (e.g., the first handler 412 of FIG. 4). The provider 414 can include an offline provider 504 and an online provider 506. The offline provider 504 and the online provider 506 can be executed in parallel with timeout (e.g., 25 milliseconds).

The offline provider 504 can perform step 508, which can involve performing validation and eligibility checks on contextual data to generate a default contextual identifier. The default contextual identifier may be a contextual identifier that matches the contextual data and is also present in the cache 218 (e.g., as a pre-computed contextual identifier 509 mapped to a pre-computed recommendation 220 in the cache 218). The offline provider 504 can then access the cache 218 to identify the pre-computed recommendation 220 that is in the same category as or is mapped to the default contextual identifier. The offline provider 504 can perform step 510, which can involve performing data processing and transformation on the recommendation. The data processing and transformation can involve any logic or changes to the recommendation that can allow the recommendation to be incorporated into presentation of the second network document (e.g., according to a parameter indicated by the recommendation). The offline provider 504 can return its recommendation to a provider aggregator 502.

In parallel with the offline provider 504, the online provider 506 can perform step 512, which can involve performing validation and eligibility checks on contextual data. Then, the online provider 506 can execute a context mapper 514 that can perform a series of processing steps on the contextual data (e.g., shopping cart composition, item count, shipping destination, user characteristics, interaction behavior data, etc.) to generate a unique contextual identifier. In some examples, the context mapper 514 can dynamically utilize contextual data mapping provided by the strategy configuration 408 of FIG. 4. In other examples, the context mapper 514 may use an ML API 312 to access a machine learning cluster 212. The machine learning cluster 212 may include machine learning models (e.g., machine learning models 210a-b) that can generate the contextual identifier.

After generating the contextual identifier, the online provider 506 can perform step 516, which can involve fetching a recommendation. For example, the online provider 506 can use the ML API 312 to prompt the machine learning cluster 212 to generate a recommendation using the contextual identifier. The machine learning cluster 212 may select a machine learning model to generate the recommendation based on the contextual identifier. For example, the machine learning cluster 212 may select the first machine learning model 210a, which may be associated with a same category as the contextual identifier. The first machine learning model 210a can transmit a response including the recommendation to the online provider 506 using the ML API 312. The online provider 506 can then perform step 518, which can involve performing data processing and transformation on the recommendation. The data processing and transformation can involve any logic or changes to the recommendation that can allow the recommendation to be incorporated into presentation of the second network document e.g., according to a parameter indicated by the recommendation). The online provider 506 can return its recommendation to a provider aggregator 502.

The provider aggregator 502 can receive and aggregate the recommendations from the offline provider 504 and the online provider 506. The provider aggregator 502 can then send the aggregated recommendations to the first handler 412a. Returning to FIG. 4, the aggregated recommendations received by each of the handlers 412a-c can be aggregated by the handler aggregator 410. The final output from the handler aggregator 410 can be used to decorate individual fields of the second network document, thus incorporating the recommendation into presentation of the second network document within latency requirements (e.g., 30 milliseconds) by using the parameter.

Figure 6:
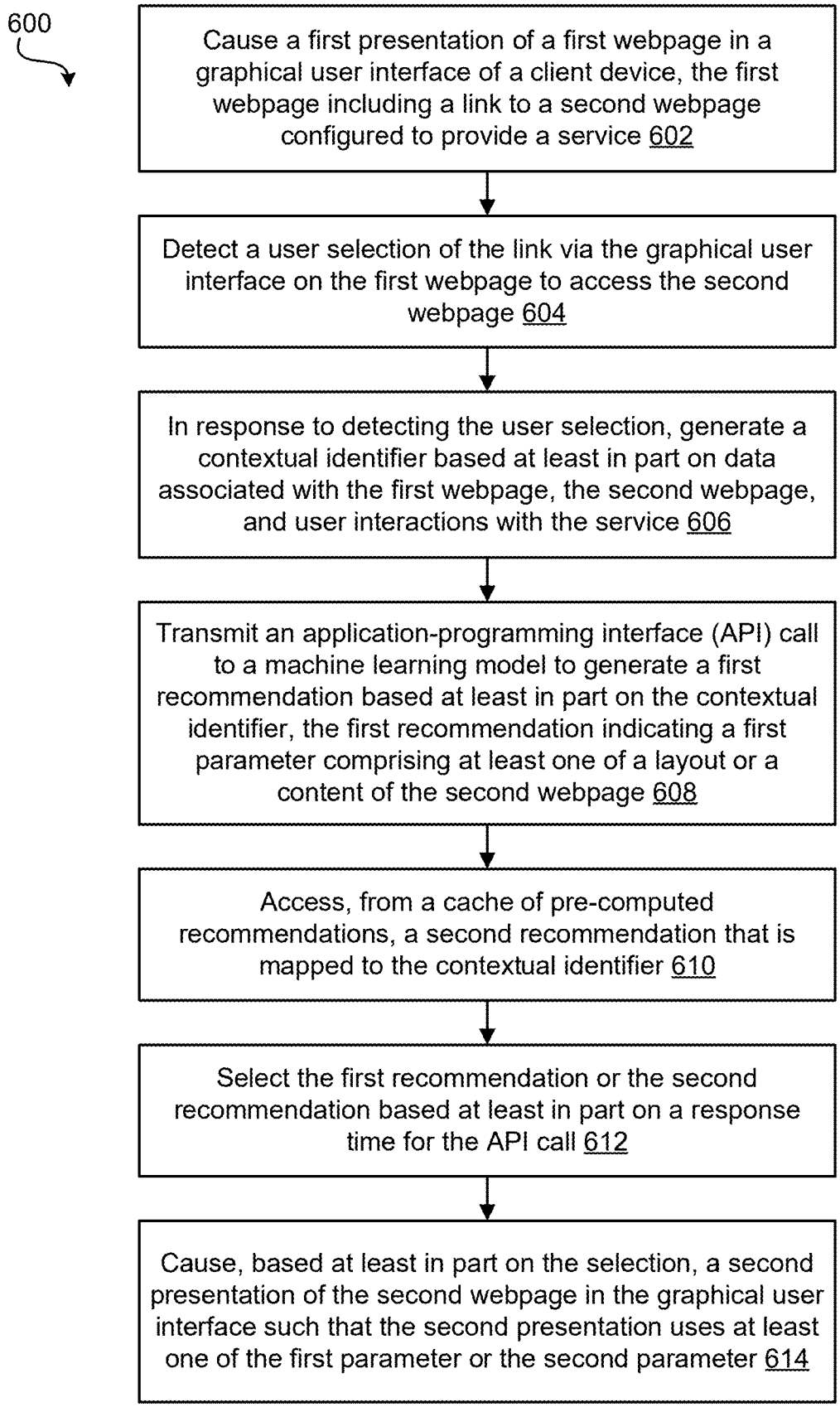
FIG. 6 illustrates an example flow for executing a machine learning model to generate a recommendation for presentation of a network document, according to an embodiment of the present disclosure.
Figure 7:
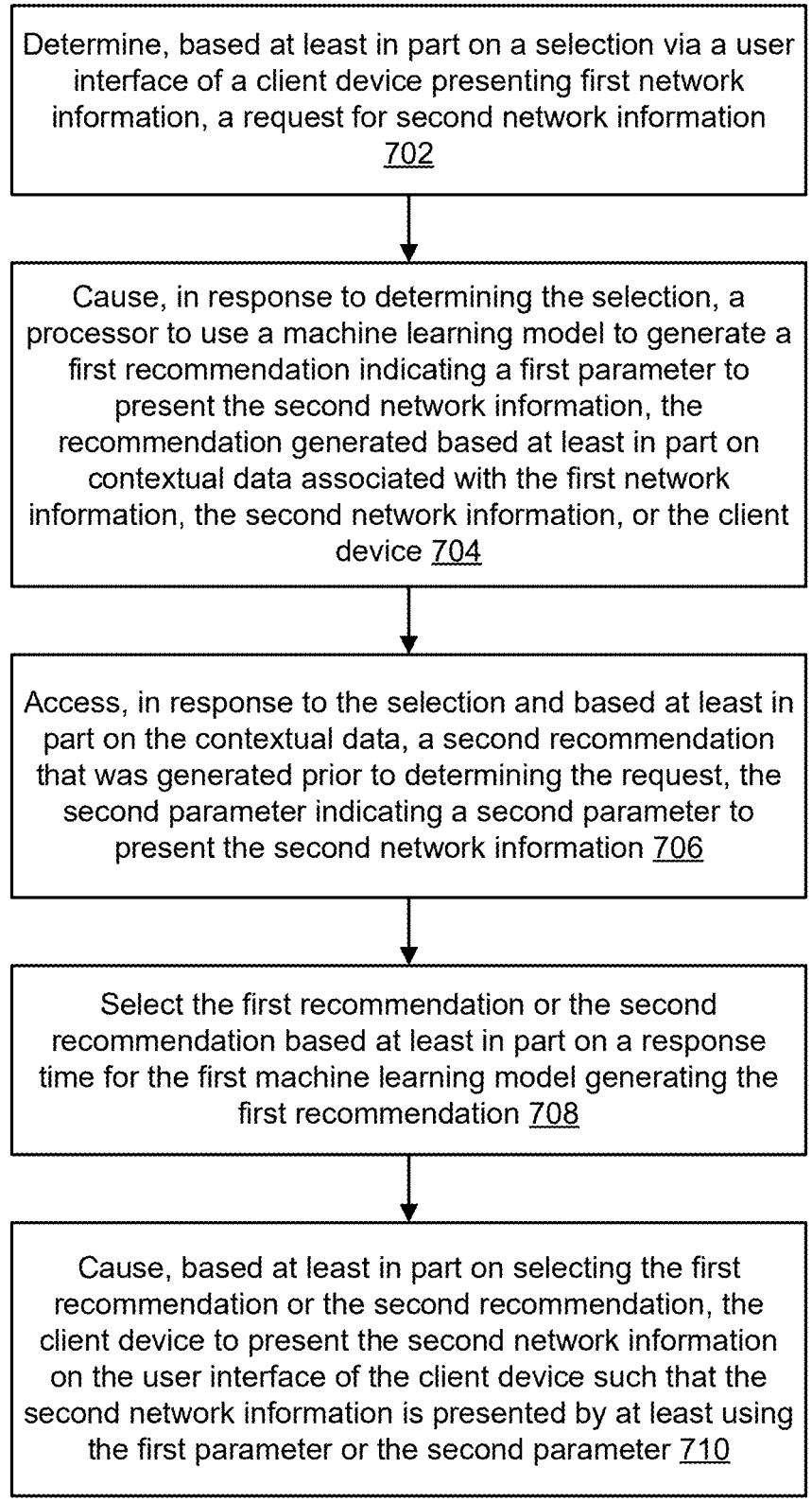
FIG. 7 illustrates an example flow for executing a machine learning model to generate a recommendation for presentation of network information, according to an embodiment of the present disclosure.
Figure 8:
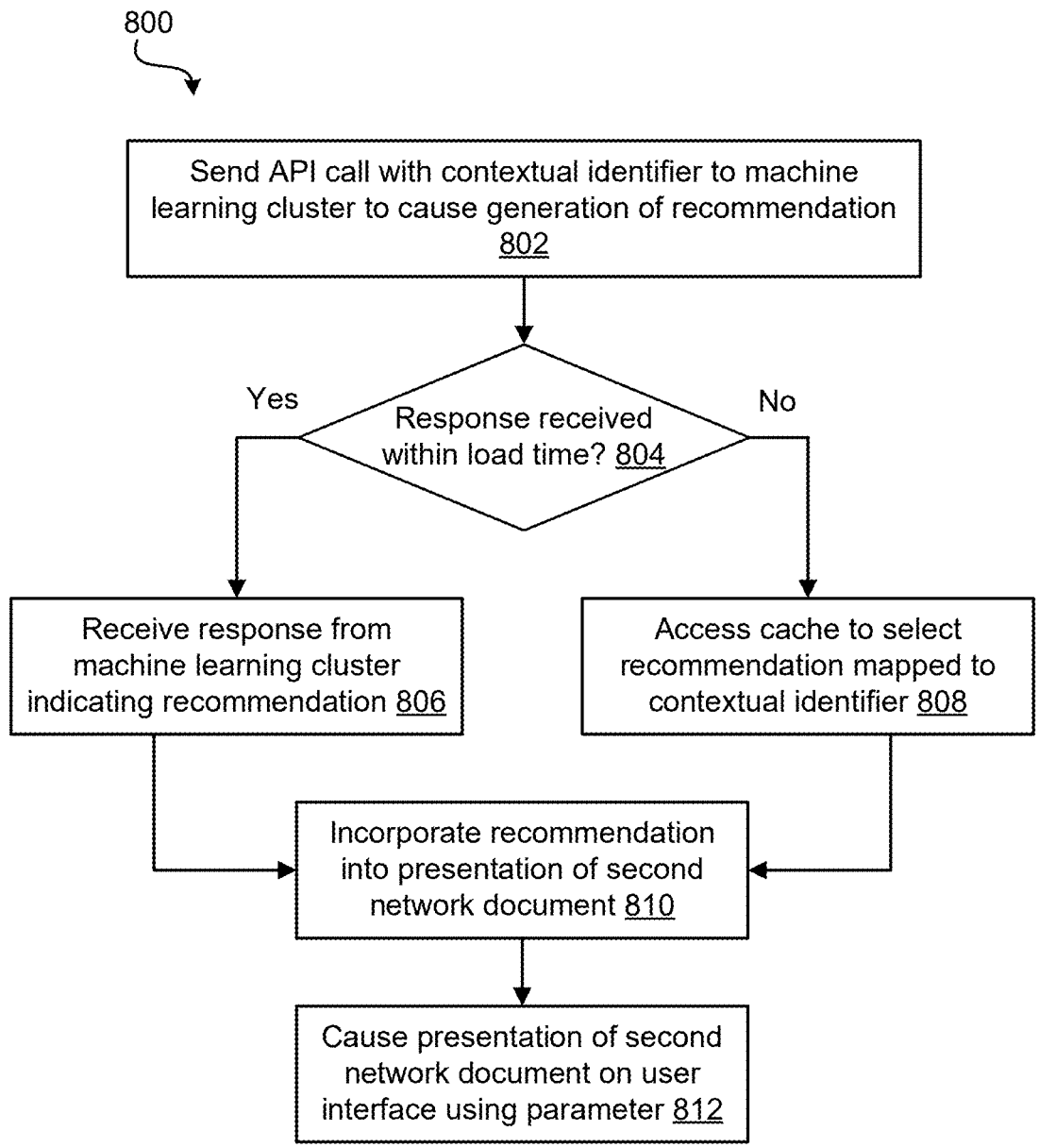
FIG. 8 illustrates an example flow for generating a recommendation for presentation of a network document, according to an embodiment of the present disclosure.

FIGS. 6, 7, and 8 illustrate example flow charts for executing a machine learning model to generate recommendations for presentation of a network document, according to embodiments of the present disclosure. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some or all of the processes 600, 700, or 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the client device 202, the computer system 208, the machine learning cluster 212, the client device 902, the web server 906, and/or the application server 908 may perform the flows 600, 700, or 800 of FIG. 6, 7, or 8.

FIG. 6 illustrates an example flow 600 for executing a machine learning model to generate a recommendation for presentation of a network document, according to an embodiment of the present disclosure. In FIG. 6, the flow 600 may include operation 602, where a computer system may cause a first presentation of a first webpage in a graphical user interface of a client device. The first webpage may include a link to a second webpage for a service. For example, the first webpage may be a shopping cart page for an electronic store service that displays items in a shopping cart that were selected by a user (e.g., on other webpages for the service). The link on the shopping cart page may be a link to a checkout page, where the user can complete the checkout process to purchase the items in the shopping cart. In some examples, in response to causing the presentation of the first webpage, the computer system can generate a cache based at least in part on contextual data, such as data associated with the first webpage and user interactions with the service. The cache can include one or more contextual identifiers mapped to one or more recommendations. In some examples, the one or more recommendations can be generated by a machine learning model based at least in part on the one or more contextual identifiers.

In an example, the flow 600 may include operation 604, where the computer system may detect a user selection of the link via the graphical user interface on the first webpage to access the second webpage. Before the second webpage is presented on the graphical user interface, it may be beneficial to modify the second webpage to include a recommendation that is based on real-time contextual data.

In an example, the flow 600 may include operation 606, where the computer system may, in response to detecting the user selection, generate a contextual identifier based at least in part on data associated with the first webpage, the second webpage, and user interactions with the service. In some examples, the computer system can generate the contextual identifier by applying a set of rules to the contextual data. In other examples, the computer system may transmit an application-programming interface (API) call with the contextual data to a machine learning model. The machine learning model can generate the contextual identifier based on the contextual data.

In an example, the flow 600 may include operation 608, where the computer system may transmit an application-programming interface (API) call to a machine learning model to generate a first recommendation based at least in part on the contextual identifier. The first recommendation can indicate a first parameter comprising at least one of a layout or a content of the second webpage. For example, the first recommendation indicating the layout can involve a ranking of payment methods displayed on the second webpage. In another example, the first recommendation indicating the content can involve a prompt to select a payment method that unlocks a benefit, such as free shipping for the items in the shopping cart. The computer system may receive a response to the API call indicating the first recommendation.

In an example, the flow 600 may include operation 610, where the computer system may access, from a cache of pre-computed recommendations, a second recommendation that is mapped to the contextual identifier. The second recommendation may indicate a second parameter that indicates a second parameter of the second webpage, such as at least one of a layout, a functionality, or a content of the second webpage.

In an example, the flow 600 may include operation 612, where the computer system can select the first recommendation or the second recommendation based at least in part on a response time for the API call. For example, the computer system can determine whether the response is received within a load time predefined for the second webpage. For example, the load time may be 25 milliseconds. Receiving the response within the load time can ensure that the second webpage can be presented on the graphical user interface of the client device within a latency requirement, such as 30 milliseconds. The computer system may select the first recommendation if the response to the API call is received within the load time. But if the response is not received within the load time, the computer system may select the second recommendation that was accessed from the cache.

In an example, the flow 600 may include operation 614, where the computer system can cause, based at least in part on the selection of the first recommendation or the second recommendation, a second presentation of the second webpage in the graphical user interface such that the first parameter or the second parameter is incorporated into the second presentation. For example, if the first recommendation was selected, the first parameter can be incorporated into the second presentation. If the second recommendation was selected, the second parameter can be incorporated into the second presentation. For example, the payment methods may be ranked on the second webpage according to the ranking generated by the machine learning model, or the second webpage may display the prompt to select a certain payment method to unlock free shipping. The second presentation of the second webpage can be caused within the latency requirement, whether or not the response to the API call was received within the load time.

FIG. 7 illustrates another example flow 700 for executing a machine learning model to generate a recommendation for presentation of network information, according to an embodiment of the present disclosure. In FIG. 7, the flow 700 can include operation 702, where a computer system can determine, based at least in part on a selection via a user interface of a client device presenting first network information, a request for second network information (e.g., network documents). In some examples, the computer system can generate, based at least in part on contextual data associated with the first network information, the second network information, or the client device, a contextual identifier. The contextual data may include geolocation data, user interactions with a service associated with the first network document and the second network document, an Internet Protocol (IP) address for the client device, user information, or client device information. In some examples, the computer system can cause, by the processor, a machine learning model to generate the contextual identifier based at least in part on an input comprising the contextual data. In some examples, the computer system can generate the contextual identifier by accessing historical user information based on identifier associated with the client device or a user account. The contextual identifier can be generated based at least in part on the historical user information.

In some examples, in response to causing a presentation of the first network information, the computer system can generate a cache. For example, the computer system can generate the cache by causing, by the processor, the machine learning model to generate one or more recommendations that are mapped to one or more contextual identifiers, which may be default contextual identifiers.

In an example, the flow 700 can include operation 704, where the computer system can cause, in response to determining the selection, a processor to use a machine learning model to generate a first recommendation indicating a first parameter to present the second network document. The first recommendation can be generated based at least in part on contextual data associated with the first network information, the second network information, or the client device. In some examples, the computer system can transmit an API call with the contextual data to the machine learning model to request the first recommendation. The computer system can then receive the response to the API call indicating the first recommendation from the machine learning model. In some examples, the computer system can cause the processor to use the machine learning model to generate the first recommendation based at least in part on a first input including the contextual identifier. The first recommendation can indicate at least one of a layout, a functionality, or a content of the second network information. In some examples, the computer system can select a particular machine learning model from a cluster of machine learning models to generate the first recommendation based at least in part on the contextual identifier.

In some examples, the first recommendation may include a ranking of interactable elements to be presented on the second network information. In some examples, a user account associated with the first network information and the second network information is accessible by a plurality of entities. The computer system can cause the processor to use the machine learning model to generate the first recommendation based at least in part on identifying that the selection was performed by a particular entity of the plurality of entities.

In an example, the flow 700 can include operation 706, where the computer system can access, in response to the selection and based at least in part on the contextual data, a second recommendation that was generated prior to determining the request. The second parameter can indicate a second parameter to present the second network information, such as at least one of a content, a functionality, or a layout of the second network information. The second recommendation can be accessed from a cache of precomputed recommendations mapped to contextual identifiers. In some examples, the second recommendation may be mapped to the contextual identifier in the cache.

In an example, the flow 700 can include operation 708, where the computer system can select the first recommendation or the second recommendation based at least in part on a response time for the machine learning model generating the first recommendation. For example, if a response time for generating the first recommendation is within a load time predefined for the second network information, the first recommendation can be selected. If the response time is not within the load time, the second recommendation can be selected.

In an example, the flow 700 can include operation 710, where the computer system can cause, based at least in part on selecting the first recommendation or the second recommendation, of the client device to present the second network information on the user interface of the client device such that the second network information is presented by at least using the first parameter or the second parameter. For example, if the first recommendation was selected, the second network information can be presented using the first parameter. If the second recommendation was selected, the second network information can be presented using the second parameter. In some examples, causing the second network information to be presented by at least using the first parameter or the second parameter can involve presenting the second network information within the load time subsequent to determining the selection via the user interface of the client device presenting the first network information.

In some examples, the computer system can detect a selection of an interactable element of the ranking of interactable elements via the user interface of the client device on the second network information. The computer system can then train the machine learning model based at least in part on the ranking of the interactable elements and the selection of the interactable element.

FIG. 8 illustrates an example flow 800 for generating a recommendation for presentation of a network document, according to an embodiment of the present disclosure. In FIG. 8, the flow 800 can include operation 802, where a computer system can send an application-programming interface (API) call with a contextual identifier to a machine learning model to cause generation of a recommendation for presentation of a second network document that is being accessed via a link from a first network document. The machine learning cluster can select a particular machine learning model to use to generate the recommendation based on the contextual identifier. For example, the machine learning cluster may select a machine learning model that belongs to a same category as the contextual identifier. The machine learning cluster may provide the contextual identifier as input to the selected machine learning model to generate an output indicating the recommendation for presentation of the second network document.

In an example, the flow 800 can include operation 804, where the computer system can determine whether a response to the API call has been received within a load time predefined for the second network document. If the response has been received within the load time, the flow 800 can continue to operation 806, as the second network document can therefore be generated and transmitted to the client device without violating latency requirements. If the response has not been received within the load time, the flow 800 can continue to operation 808.

In an example, the flow 800 can include operation 806, where the computer system can receive the response from the machine learning model. The response may indicate the recommendation for presentation of the second network document. Receiving the response within the load time can allow the second network document to be loaded on the client device within latency requirements for the second network document (e.g., within 30 milliseconds). The flow 800 can continue to operation 810.

In an example, the flow 800 can include operation 808, where the computer system can access a cache to select a recommendation that is mapped to the contextual identifier. The recommendation from the cache can be accessed as a fallback option if the machine learning model does not generate the recommendation fast enough. The cached recommendation can allow the second network document to be loaded on the client device within the latency requirements for the second network document. The flow 800 can continue to operation 810.

In an example, the flow 800 can include operation 810, where the computer system can incorporate the recommendation (that was either generated by the machine learning model or retrieved from the cache) into presentation of the second network document. For example, the recommendation may indicate a parameter such as a layout, a functionality, or a content of the second webpage. The computer system can populate fields of the second network document using the parameter or can position or rank elements of the second network document using the parameter. In an example, the flow 800 can include operation 812, where the computer system can cause presentation of the second network document on a user interface of the client device using the parameter. The time between receiving a request to access the second network document and transmitting the second network document with the incorporated recommendation can be within a latency requirement for the second network document.

Figure 9:
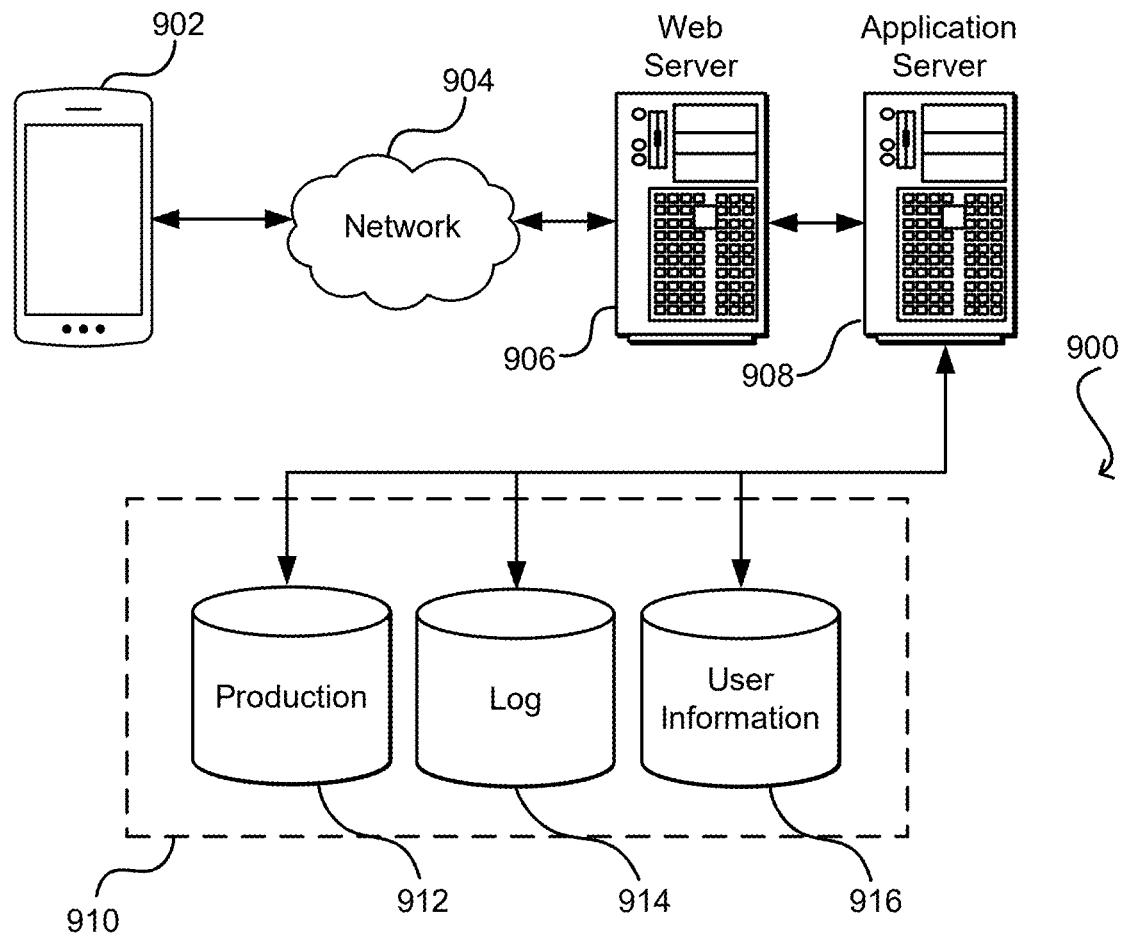
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Any data collected by embodiments described herein (e.g., contextual data) may only be collected and generated when proper permissions (e.g., those of a user) are obtained. Collection, storage, and/or use of data related to a particular person or device may be controlled by a user using privacy controls associated with a device and/or a companion application associated with the device. Accordingly, users may opt out of collection and storage of data and/or may select particular types of data that may be collected while preventing aggregation and storage of other types of data. Additionally, collection, aggregation, storage, and use of information, as described herein, may be compliant with privacy controls, even if not technically subject to them, to bolster user trust. For example, data described herein may be treated as if it fell under acts and regulations, such as the Health Insurance Portability and Accountability Act (HIPAA) and the General Data Protection Regulation (GDPR), even if it does not actually fall under these acts and regulations.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®), Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system, comprising:
one or more processors; and
one or more memories storing executable instructions that, upon execution by the one or more processors, cause the computer system to perform operations to:
cause a first presentation of a first webpage in a graphical user interface of a client device, the first webpage including a link to a second webpage configured to provide a service;
detect a user selection of the link via the graphical user interface on the first webpage to access the second webpage; and
in response to detecting the user selection:
generate a contextual identifier based at least in part on data associated with the first webpage, the second webpage, and user interactions with the service;
transmit an application-programming interface (API) call to a machine learning model to generate a first recommendation based at least in part on the contextual identifier, the first recommendation indicating a first parameter comprising at least one of: a layout, a functionality, or a content of the second webpage;

access, from a cache of pre-computed recommendations, a second recommendation that is mapped to the contextual identifier, the second recommendation indicating a second parameter of the second webpage;

select the first recommendation or the second recommendation based at least in part on a response time for the API call; and cause, based at least in part on the selection of the first recommendation or the second recommendation, a second presentation of the second webpage in the graphical user interface such that the second presentation uses the first parameter or the second parameter.

2. The computer system of claim 1, wherein the executable instructions, upon execution, cause the computer system to perform further operations to cause the client device to present the second webpage using the second parameter by:

determining that a load time predefined for the second webpage has expired and that the response to the API call has not been received; and in response to determining that the load time has expired and the response has not been received:

identify, from the cache comprising one or more contextual identifiers mapped to one or more recommendations, the second recommendation associated with the contextual identifier; and present, on the graphical user interface of the client device, the second webpage such that the second parameter is incorporated into presentation of the second webpage.

3. The computer system of claim 2, wherein the executable instructions, upon execution, cause the computer system to perform further operations to, prior to transmitting the API call to the machine learning model and in response to causing the first presentation of the first webpage:

generate, by at least using the machine learning model, the cache based at least in part on data associated with the first webpage and user interactions with the service, wherein the cache comprises the one or more contextual identifiers mapped to the one or more recommendations.

4. The computer system of claim 1, wherein the API call is a first API call, wherein the machine learning model is a first machine learning model, and wherein the executable instructions, upon execution, cause the computer system to perform further operations to generate the contextual identifier by at least:

transmitting a second API call to a second machine learning model to generate the contextual identifier based at least in part on the data associated with the first webpage, the second webpage, and user interactions with the service; and receiving the contextual identifier from the second machine learning model in response to transmitting the second API call.

5. A computer-implemented method, comprising:

determining, based at least in part on a selection via a user interface of a client device presenting first network information, a request for second network information;

causing, in response to the selection, a processor to use a machine learning model to generate a first recommendation indicating a first parameter to present the second network information, the first recommendation generated based at least in part on contextual data associated with at least one of the first network information, the second network information, or the client device;

accessing, in response to the selection and based at least in part on the contextual data, a second recommendation that was generated prior to determining the request, the second recommendation indicating a second parameter to present the second network information;

selecting the first recommendation or the second recommendation based at least in part on a response time for the machine learning model generating the first recommendation; and causing, based at least in part on selecting the first recommendation or the second recommendation, the client device to present the second network information on the user interface such that the second network information is presented by at least using the first parameter or the second parameter.

6. The computer-implemented method of claim 5, further comprising:

generating, based at least in part on the contextual data, a contextual identifier; and causing the processor to use the machine learning model to generate the first recommendation based at least in part on a first input comprising the contextual identifier.

7. The computer-implemented method of claim 6, wherein the method further comprises:

determining that a load time predefined for the second network information has expired and the second recommendation has not been generated by the machine learning model; and in response to determining that the load time has expired and the second recommendation has not been generated by the machine learning model:

identifying, from a cache comprising one or more contextual identifiers mapped to one or more recommendations, the second recommendation that is mapped to the contextual identifier; and causing the client device to present the second network information on the user interface of the client device such that the second network information is presented by at least using the second parameter.

8. The computer-implemented method of claim 7, further comprising, prior to causing the machine learning model to generate the second recommendation and in response to causing the client device to present the first network information:

generating the cache based at least in part on contextual data associated with the first network information and the client device by causing, by the processor, the machine learning model to generate one or more recommendations mapped to the one or more contextual identifiers.

9. The computer-implemented method of claim 6, wherein the machine learning model is a first machine learning model, and wherein generating the contextual identifier further comprises:

causing, by the processor, a second machine learning model to generate the contextual identifier based at least in part on a second input comprising the contextual data.

10. The computer-implemented method of claim 6, wherein generating the contextual identifier further comprises:

accessing historical user information based on an identifier associated with the client device or a user account; and generating the contextual identifier based at least in part on the historical user information.

11. The computer-implemented method of claim 6, further comprising:

selecting the machine learning model from a cluster of machine learning models based at least in part on the contextual identifier.

12. The computer-implemented method of claim 6, wherein the contextual data further comprises geolocation data, user interactions with a service associated with the first network information and the second network information, Internet Protocol (IP) address for the client device, user information, or client device information.

13. The computer-implemented method of claim 5, wherein causing the processor to use the machine learning model to generate the first recommendation further comprises:

transmitting an application-programming interface (API) call comprising the contextual data to the machine learning model to request the first recommendation; and receiving, from the machine learning model, a response to the API call indicating the first recommendation.

14. The computer-implemented method of claim 5, wherein the first recommendation comprises a ranking of interactable elements to be presented on the second network information.

15. The computer-implemented method of claim 14, wherein the selection is a first selection, and wherein the computer-implemented method further comprises:

detecting a second selection of an interactable element of the ranking of interactable elements via the user interface of the client device on the second network information; and training the machine learning model based at least in part on the ranking of interactable elements and the second selection.

16. The computer-implemented method of claim 5, wherein a user account associated with the first network information and the second network information is accessible by a plurality of entities, and wherein the method further comprises causing the processor to use the machine learning model to generate the first recommendation based at least in part on identifying that the selection was performed by a particular entity of the plurality of entities.

17. The computer-implemented method of claim 5, wherein causing the client device to present the second network information on the user interface such that the second network information is presented by at least using the first parameter or the second parameter further comprises presenting the second network information within a load time predefined for the second network information subsequent to detecting the selection via the user interface presenting the first network information.

18. A computer-readable storage medium storing computer-executable instructions that, when executed by one or more processors of a computer system, cause the computer system to perform operations comprising:

determining, based at least in part on a selection via a user interface of a client device presenting a first network information, a request for a second network information;

causing, in response to the selection, the one or more processors to use a machine learning model to generate a recommendation indicating a parameter to present the second network information, the recommendation generated based at least in part on contextual data associated with at least one of the first network information, the second network information, or the client device;

determining that the recommendation is generated within a load time predefined for the second network information; and causing, based at least in part on the recommendation being generated within the load time, the client device to present the second network information on the user interface of the client device such that the second network information is presented by at least using the parameter.

19. The computer-readable storage medium of claim 18, wherein the operations further comprise:

generating, based at least in part on the contextual data, a contextual identifier; and causing the one or more processors to use the machine learning model to generate the recommendation based at least in part on a first input comprising the contextual identifier.

20. The computer-readable storage medium of claim 19, wherein the parameter includes at least one of: a layout, a functionality, or a content of the second network information.

* * * * *